Oct. 5, 1926.
C. L. BASTIAN
1,602,320
TORCH
Filed April 9, 1926
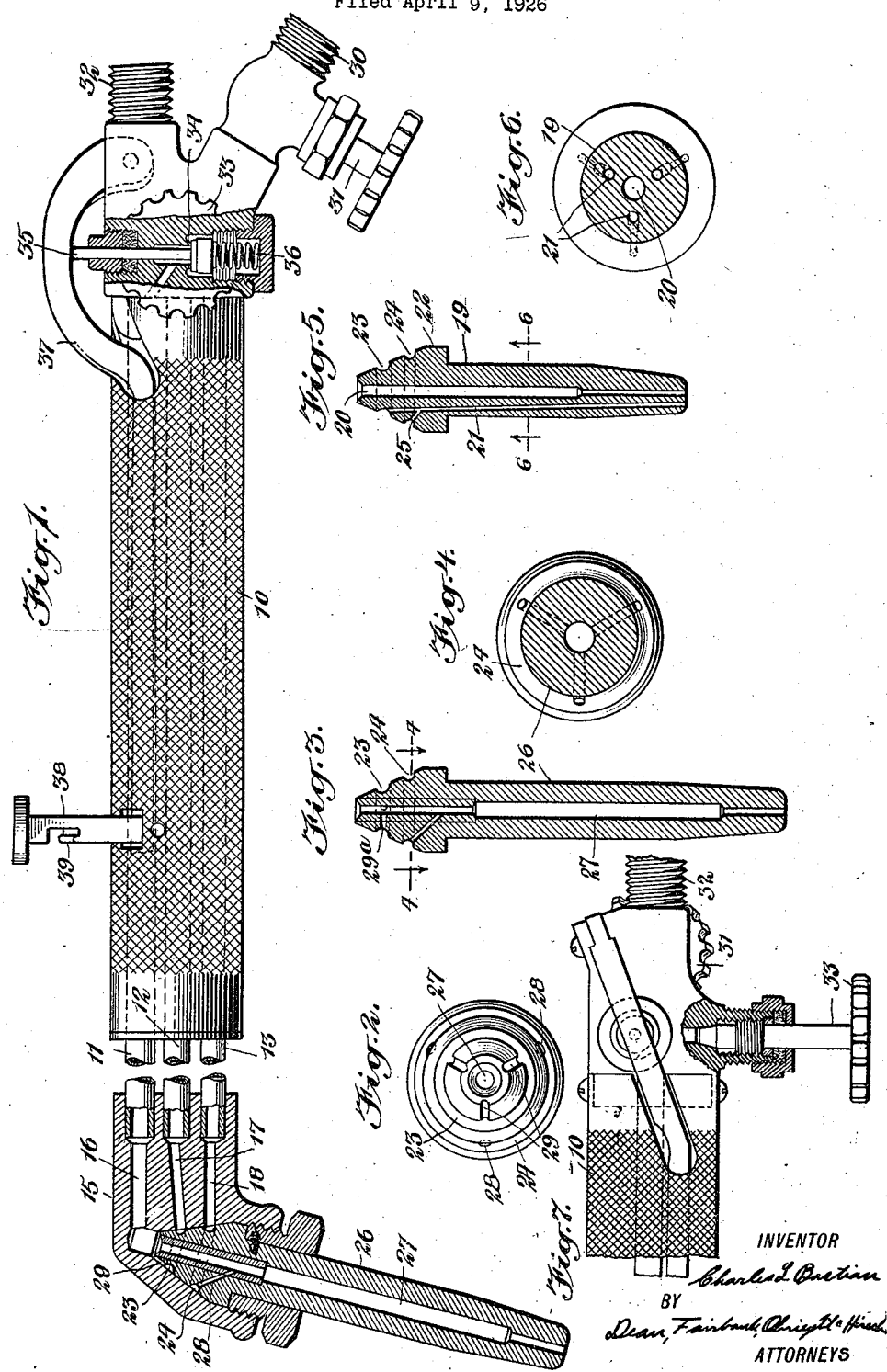
INVENTOR
Charles L. Bastian
BY
Dean, Fairbank, Wright & Hirsch
ATTORNEYS Patented Oct. 5, 1926.

1,602,320

UNITED STATES PATENT OFFICE.

CHARLES L. BASTIAN, OF CHICAGO, ILLINOIS, ASSIGNOR TO THE BASTIAN BLESSING COMPANY, OF CHICAGO, ILLINOIS, A CORPORATION OF ILLINOIS.

TORCH.

Application filed April 9, 1926. Serial No. 100,831.

This invention is an improvement in torches, and has for its main object the provision of certain novel features and combinations of parts whereby the torch may be employed for either welding or cutting operations.

In carrying out my invention I employ a cutting torch having a head provided with three passages, to one of which may be delivered high pressure oxygen for cutting, and to the other two of which may be delivered the acetylene or other combustible gas and the oxygen of other combustion support, the two gases being delivered through the separate passages, and preferably under lower pressure than that of the cutting oxygen.

The ordinary cutting torch tip has a central passage for the cutting oxygen, and one or more eccentrically disposed passages adapted to communicate with the other two passages of the head to form the gas mixture for the flame or flames at the end of the tip. The ordinary heating or welding tip cannot be used with such a torch, as it has a central passage for the gas mixture and receives one of the gases through the center of the tip and the other through side passages. Thus, it has no means for communicating with the two passages of the head which deliver the two gases for forming the gas mixture.

In my improved construction I provide a heating or welding tip which is so designed that it may be employed with the ordinary cutting torch, in place of the cutting tip, and will receive gas for the combustible mixture from the gas passages of the torch which are provided for that purpose. The tip has a single central passage for the mixture, and does not need to be rotated to any particular position when attached to the head. The tip may be made from a standard tip blank, the difference from the standard welding tip being primarily in the passages which are drilled or cut therein.

In the accompanying drawing I have illustrated a torch constructed in accordance with my invention. In this drawing:

Fig. 1 is a side elevation of a torch, certain of the parts being shown in section.

Fig. 2 is an end view of the tip shown in Fig. 1.

Fig. 3 is a longitudinal section of a modified form of heating or welding tip.

Fig. 4 is a transverse section on the line 4—4 of Fig. 3.

Fig. 5 is a longitudinal section of a cutting tip which forms no portion of my present invention, but which may be employed with the torch shown in Fig. 1.

Fig. 6 is a transverse section on the line 6—6 of Fig. 5, but on a larger scale, and Fig. 7 is a plan view of the valve block of the handle, a portion being shown in section.

In the form illustrated, the torch is provided with a suitable handle 10 through which extend three tubes 11, 12 and 13. These tubes, at the rear end of the handle connect to a valve block 14, while at the front end they connect to a head 15 having corresponding passages 16, 17 and 18. The tube 11 and the passage 16 are for the high pressure cutting oxygen, and the passage delivers to the center of a tip seat within the head. The tip seat is shown as conical in form, with the passage 16 leading to the apex of the cone. The passages 17 and 18 are for the combustion-supporting gas and the combustible gas. Either one of these gases may be delivered to either passage, dependent upon the construction of the valve block 14 and the relative diameters and positions of the passages in the tip. The two passages 17 and 18 enter the tip seat at spaced points, and at different distances from the center of the seat.

When the torch is to be used as a cutting torch I may employ the standard form of cutting tip shown in Figs. 5 and 6. This tip 19 has a center passage 20 for the cutting oxygen, and a plurality of eccentrically disposed passages 21 for the combustible mixture. The conical head 22 of the tip is adapted to fit the conical seat in the head in the torch, and on the conical portion of the tip are a pair of annular grooves 23 and 24 which will register with the passages 17 and 18 of the head. Each gas mixture passage 21 leads from the groove 23, and has a branch passage 25 leading from the groove 24 so that the gas delivered through the passages 17 and 18 may comingle in the passage 21 of the tip, and the several flames may be formed at the end of the tip.

In the operation the valves controlling the passages 17 and 18 are regulated to give the desired pressure and flow of the gas to produce the desired heating flame. When the metal has been heated to the required extent, the valve of the passage 16 is opened and the cutting oxygen is delivered through this passage and through the center passage 20 of the tip.

In connection with this torch I provide a kind of heating or welding tip, two forms of which are shown in the drawing. In the tip shown in Figs. 1 and 2 the tip 26 has a central passage 27 and annular grooves 23 and 24 corresponding in position to those employed in the cutting tip. The tip has one or more branch passages 28 from which gas from the passage 18 may flow to the central passage 27. Means is also provided for permitting gas from the passage 17 to flow to the central passage of the tip. As shown in Figs. 1 and 2, this means includes passages 29 cut in the conical surface of the tip between the groove 23 and the end of the head of the tip, so that gas from the passage 18 may flow to the groove 23, thence along the grooves or passages 29 to the small chamber at the inner end of the tip seat, and then to the central passage 27 of the tip. With the valve of the cutting oxygen passage 16 closed, it will be noted that gas from the two passages 17 and 18 will enter the center passage of the tip and form therein the combustible mixture for forming the single flame at the end of the tip. The passages 28 and 29 are of the required number and cross-sectional area, so that the two gases will be delivered in the proper proportions and under the proper pressure to form the desired flame.

Instead of having the passages 29 cut in the surface of the tip, as shown in Figs. 1 and 2, these passages may be drilled from the groove 23 directly to the central passage 27. In Figs. 3 and 4 I have shown a construction in which there are employed drilled holes 29ᵃ, to serve the same purpose as the grooves 29 of Figs. 1 and 2.

The valve mechanism in the valve block 14 is preferably such that the pressures of the gas delivered through the passages 17 and 18 may be adjusted in the usual manner, and the supply of cutting oxygen may be quickly turned on or shut off, as desired. In the form illustrated the combustible gas is delivered through a hose connected to the nipple 30 which has a regulating needle valve 31, while the oxygen is delivered through a nipple 32. Within the valve block is a needle valve 33 for regulating the supply of oxygen to one of the lower passages 12 or 13, and a reciprocating valve 34 of the poppet type, for controlling the supply of cutting oxygen to the passage 16. The valve 34 is shown as having its stem 35 extending through a stuffing box to the upper side of the valve block, and with a spring 36 for normally holding the valve in closed position. A lever 37 is pivoted to the valve block, extends over the upper end of the valve stem 35, and thence to the interior of the handle 10. Adjacent to the front end of the handle the lever is provided with a push button or operating member 38, which may be depressed by the thumb to thereby open the cutting oxygen passage. Preferably this push button or operating piece 38 is pivoted to the lever and has a catch portion 39 whereby it may engage with a part of the handle to lock the valve in depressed position with the cutting oxygen valve open. By releasing the catch the spring 36 will close the valve.

It will be noted that my improved construction may be provided with the usual set of cutting tips, and may be used in the ordinary way as a cutting torch, and may also be provided with a second set of tips for producing heating or welding flames of varying sizes. The single torch thus serves for both heating and welding purposes. It is obvious that when used as a heating or welding torch, the valve 34 is permitted to remain closed.

Having thus described my invention, what I claim as new and desire to secure by Letters Patent is:—

1. A torch having a head provided with a seating surface for a tip, a cutting oxygen passage leading to the center of said surface, and separate passages for combustible gas and combustion-supporting gas leading to said surface at different distances from the center, separate valves for said passages, and a heating or welding tip having a seating surface, a central passage, and separate passages for connecting said central passage of the tip with said separate passages of the head, whereby when the valve of the cutting oxygen passage of the head is closed, a combustible mixture may be delivered through said central passage of the tip.

2. A torch having a head provided with a conical seat, a cutting oxygen passage leading to the apex of the conical seat, separate passages for combustible gas, and combustion supporting gas leading to said conical surface at different distances from the apex, regulating valves for controlling said separate passages, a spring-pressed shut-off valve for controlling said cutting oxygen passage, and a welding tip having a conical head adapted to engage said seat, and provided with a pair of annular grooves adapted to register with said separate passages of the torch head, said tip having a single central passage, and separate passages connecting said grooves with said central passage.

3. A torch having a head provided with a conical seat, a cutting oxygen passage leading to the apex of the conical seat, separate passages for combustible gas and combustion supporting gas leading to said conical surface at different distances from the apex, regulating valves for controlling said separate passages, a spring-pressed shut-off valve for controlling said cutting oxygen passage, and a welding tip having a conical head adapted to engage said seat, and provided with a pair of annular grooves adapted to register with said separate passages of the torch head, said tip having a single central passage, passages leading thereto from the larger of said grooves, and passages leading along the conical surface of the tip from the smaller of said grooves to the smaller end of the tip head.

Signed at Chicago, in the county of Cook and State of Ill. this 6th day of April, A. D. 1926.

CHARLES L. BASTIAN.